(No Model.)
J. P. LAVIGNE.
AIR CUSHION TIRE.
No. 490,827. Patented Jan. 31, 1893.
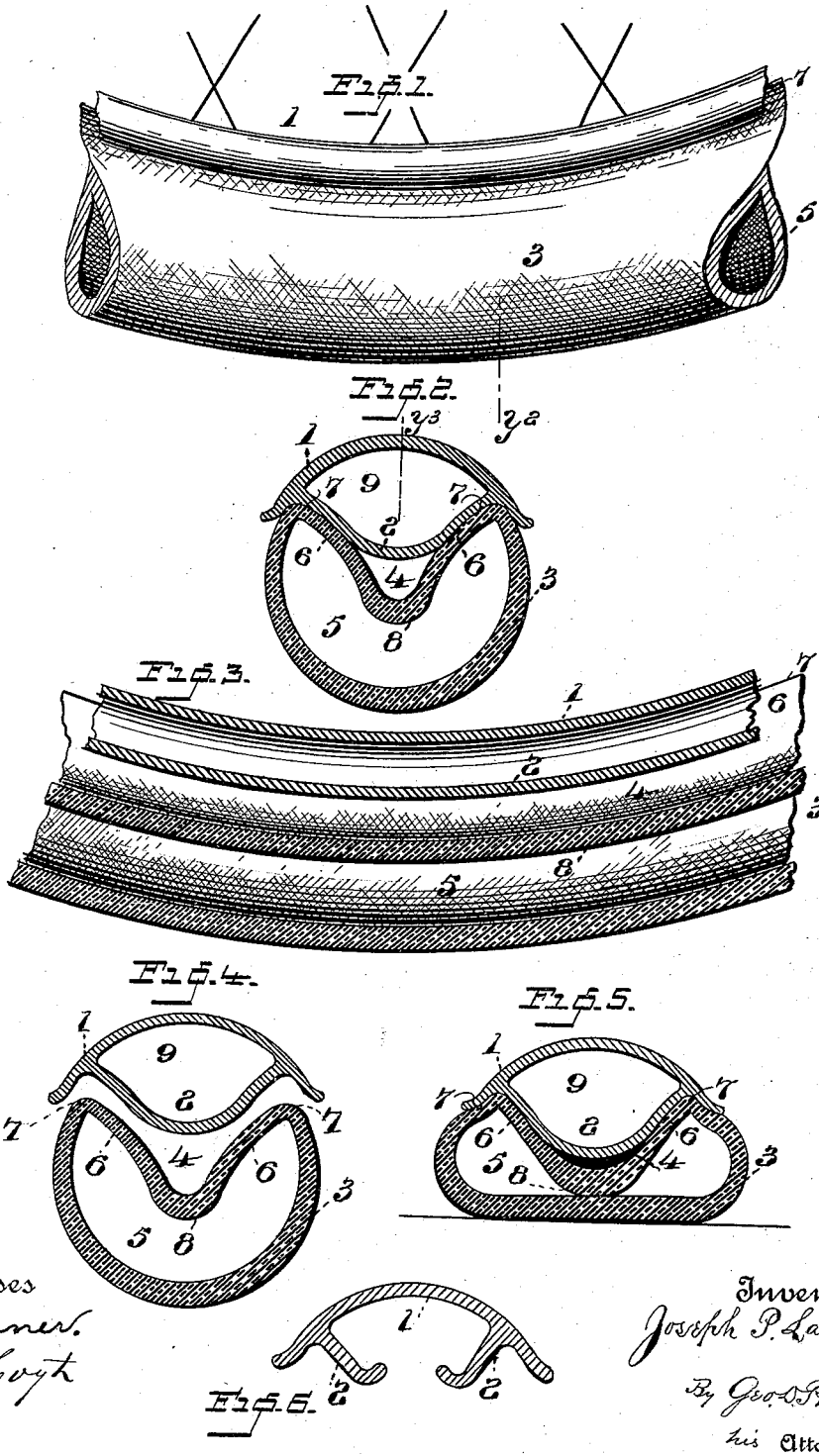

UNITED STATES PATENT OFFICE.

JOSEPH P. LAVIGNE, OF NEW HAVEN, CONNECTICUT, ASSIGNOR OF ONE-HALF TO REUBEN H. BROWN, OF SAME PLACE.

AIR-CUSHION TIRE.

SPECIFICATION forming part of Letters Patent No. 490,827, dated January 31, 1893.

Application filed July 6, 1892. Serial No. 439,161. (No model.)

*To all whom it may concern:*

Be it known that I, JOSEPH P. LAVIGNE, a citizen of the United States, and a resident of New Haven, in the county of New Haven and State of Connecticut, have invented certain new and useful Improvements in Air-Cushion Tires for Bicycles, of which the following is a specification.

My invention relates to an improvement in bicycle wheels, and particularly to the tire and rim. The object of which is to so construct the tire and rim that an air space is formed between the two, so that in case of a collapsed tire a temporary sustaining point may be maintained by reason of such air space and rim.

The arrangement and construction of the several parts for accomplishing the desired result, will be more fully described in the following specification and such characteristic features as I believe to be new and novel particularly pointed out in the claims to follow.

To enable others to understand and construct my said invention, reference is had to the accompanying drawings and to the figures of reference formed thereon, which form part of this specification.

Figure 1, represents a broken longitudinal section of a pneumatic tire, rim and spokes. Fig. 2, cross section of the tire and rim through $y^2$ of Fig. 1. Fig. 3, is a broken section and central sectional view of the tire and rim through $y^3$ of Fig. 2. Fig. 4, cross section of the rim and tire showing the tire detached from the rim. Fig. 5, represents cross section of the tire and rim, showing the tire compressed. Fig. 6, a modification of the rim.

Its construction and operation are as follows;

1 represents the inner convex surface of the rim to which the spokes are attached, 2 the outer convex surface against which the tire is supported; 3 the tire, 4 grooved depression in the outer surface extending within the tire, and circumferentially around the same, forming an air chamber; 5 cavity within the tire for compressed air. The preferable shape of the rim is double convex, as shown in cross section and also tubular. The outer convex surface 2 will conform in shape to the sides 6 of the groove 4 of the tire 3 for a part of the distance only, thus leaving the remaining portion of said groove to form a chamber for an air cushion, as will be hereinafter more fully described. The meeting faces of the tire and rim are cemented together. The upper corners 7 of the circumferential groove 4 of the tire 3,—see Figs. 2, 4 and 5—will fit corresponding corners formed by the convex surface 2, and the projecting ends of the convex surface 1 of the rim, which will assist very materially in connection with the cement, in holding the tire to the rim. The air within the tire being raised by compression above the ordinary atmospheric pressure, there is constant tendency to escape therefrom by means of the porous condition of the rubber, or from an accidental puncture it may receive. In either case, the escape of air will cause the tire to collapse, and when such a condition exists, it is unsafe, ordinarily, to continue its use without running the risk of permanently injuring the tire. To provide against such a contingency and enable the wheel to be used with perfect safety to the tire, and enable the rider to reach home, or any convenient place where repairs can be made, I employ the air space between the tire and rim to form a cushion and thereby prevent an entire collapse of the tire. The inward movement due to traction will strike the extreme point 8 of the groove 4,—see Fig. 5—and by so doing arrest further depression. The air will be compressed in the space or chamber 4, forming a cushion that will sustain the weight of the rider and prevent said tire being compressed beyond the safety point, besides, furnishing sufficient resistance for good traction, so that the loss of air from the tire would scarcely be noticed.

The form of the rim may be somewhat varied, for instance, the apex of the convex surface 2 see Fig. 6 may be removed, so that the interior space 9 of said rim, may open into the air space 4 of the tire, when the two are joined together.

Other changes in detail could be made without departing from the spirit of my invention, the gist of which consists in forming an air space between the rim and tire wherein the air is compressed, so as to sustain the latter when in a collapsed condition.

Having thus described my invention, what I claim as new and wish to secure by Letters Patent, is;

1. The herein described improvement in bicycle wheels, comprising in combination, a metal rim, a flexible tire adapted to hold compressed air, an independent air chamber situated between the tire and rim, wherein the air may be compressed, so as to sustain an exhausted or partially exhausted tire, and thereby prevent complete collapse of the same, substantially as described.

2. The herein described improvement in bicycle wheels, comprising in combination, a metal rim, a flexible tire, adapted to hold compressed air, an independent air chamber situated between the outer surfaces of the tire and rim, and circumferential therewith, such independent air chamber adapted to arrest the inward depression of an exhausted or partially exhausted tire by reason of the engagement of the depressed tire with the outer wall thereof, substantially as set forth.

3. The herein described improvement in bicycle wheels comprising in combination, a pneumatic tire adapted for holding compressed air and having a depression formed in its outer surface extending within the cavity of the tire and circumferential therewith, a metal rim having an outer convex face adapted to enter the depression in the tire partially filling the same, so as to leave an air space, or circumferential air chamber between the tire and rim, to sustain the tire—when exhausted, or partially exhausted—at a predetermined point within said tire, so as to prevent its total collapse, thereby rendering its traction safe, substantially as described.

4. The herein described improvement in bicycle wheels, comprising in combination, the pneumatic flexible tire 3, having the depression 4 in its outer surface, said depressed portion of the tire carried into the cavity of said tire, the metal rim having the raised outer surface 2 to engage with the sides of the depression in the tire for a part of its depth, and means substantially as described for attaching it thereto, the remaining distance between the rim and bottom of said depression of the tire forming an air chamber, against whose outer wall 8 the traction face of the tire proper may impinge, compressing the air within said chamber so as to form a cushion to sustain the tire against further depression, substantially as described and set forth.

Signed at New Haven, in the county of New Haven and State of Connecticut, this 29th day of June, A. D. 1892.

JOSEPH P. LAVIGNE.

Witnesses:
HARRY W. ASHER,
LEWIS ASHER.